US009170854B2

(12) United States Patent
Breternitz et al.

(10) Patent No.: US 9,170,854 B2
(45) Date of Patent: Oct. 27, 2015

(54) THREAD ASSIGNMENT FOR POWER AND PERFORMANCE EFFICIENCY USING MULTIPLE POWER STATES

(71) Applicant: Advanced Micro Devices, Inc., Sunnyvale, CA (US)

(72) Inventors: Mauricio Breternitz, Austin, TX (US); Leonardo Piga, Campinas (BR)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 332 days.

(21) Appl. No.: 13/909,789

(22) Filed: Jun. 4, 2013

(65) Prior Publication Data

US 2014/0359633 A1    Dec. 4, 2014

(51) Int. Cl.
*G06F 9/50* (2006.01)
*G06F 9/48* (2006.01)
*G06F 1/32* (2006.01)

(52) U.S. Cl.
CPC ............... *G06F 9/5094* (2013.01); *G06F 1/32* (2013.01); *G06F 1/329* (2013.01); *G06F 9/4893* (2013.01); *G06F 9/5088* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | |
|---|---|---|---|
| 2009/0222654 A1* | 9/2009 | Hum et al. ................ | 713/100 |
| 2009/0328055 A1* | 12/2009 | Bose et al. ................ | 718/105 |
| 2012/0005683 A1* | 1/2012 | Bower et al. ............. | 718/103 |
| 2012/0284729 A1* | 11/2012 | Sharda et al. ............ | 718/104 |
| 2012/0291040 A1 | 11/2012 | Breternitz et al. | |
| 2012/0297163 A1 | 11/2012 | Breternitz et al. | |
| 2013/0067132 A1* | 3/2013 | Guddeti et al. .......... | 710/260 |
| 2014/0115363 A1* | 4/2014 | Tu et al. .................. | 713/323 |
| 2014/0129808 A1* | 5/2014 | Naveh et al. ............ | 712/225 |
| 2014/0281610 A1* | 9/2014 | Biswas et al. ........... | 713/322 |

OTHER PUBLICATIONS

Rodrigues et al., "Scalable Thread Scheduling in Asymmetric Multicores for Power Efficiency", 2012, 8 pages, 2012 IEEE 24th International Symposium on Computer Architecture and High Performance Computing.

(Continued)

*Primary Examiner* — Emerson Puente
*Assistant Examiner* — Benjamin Wu
(74) *Attorney, Agent, or Firm* — Park, Vaughan, Fleming & Dowler LLP

(57) ABSTRACT

A method is performed in a computing system that includes a plurality of processing nodes of multiple types configurable to run in multiple performance states. In the method, an application executes on a thread assigned to a first processing node. Power and performance of the application on the first processing node is estimated. Power and performance of the application in multiple performance states on other processing nodes of the plurality of processing nodes besides the first processing node is also estimated. It is determined that the estimated power and performance of the application on a second processing node in a respective performance state of the multiple performance states is preferable to the power and performance of the application on the first processing node. The thread is reassigned to the second processing node, with the second processing node in the respective performance state.

20 Claims, 7 Drawing Sheets

(56) References Cited

OTHER PUBLICATIONS

Yigitbasi et al., "Energy Efficient Scheduling of MapReduce Workloads on Heterogeneous Clusters", Dec. 12, 2011, 6 pages, Green Computing Middleware of the 2$^{nd}$ International Workshop, Lisbon, Portugal.

Low et al, "GraphLab: A Distributed Framework for Machine Learning in the Cloud", arXiv: 1107.0922v1 [cs.LG], Jul. 5, 2011, 14 pages.

* cited by examiner

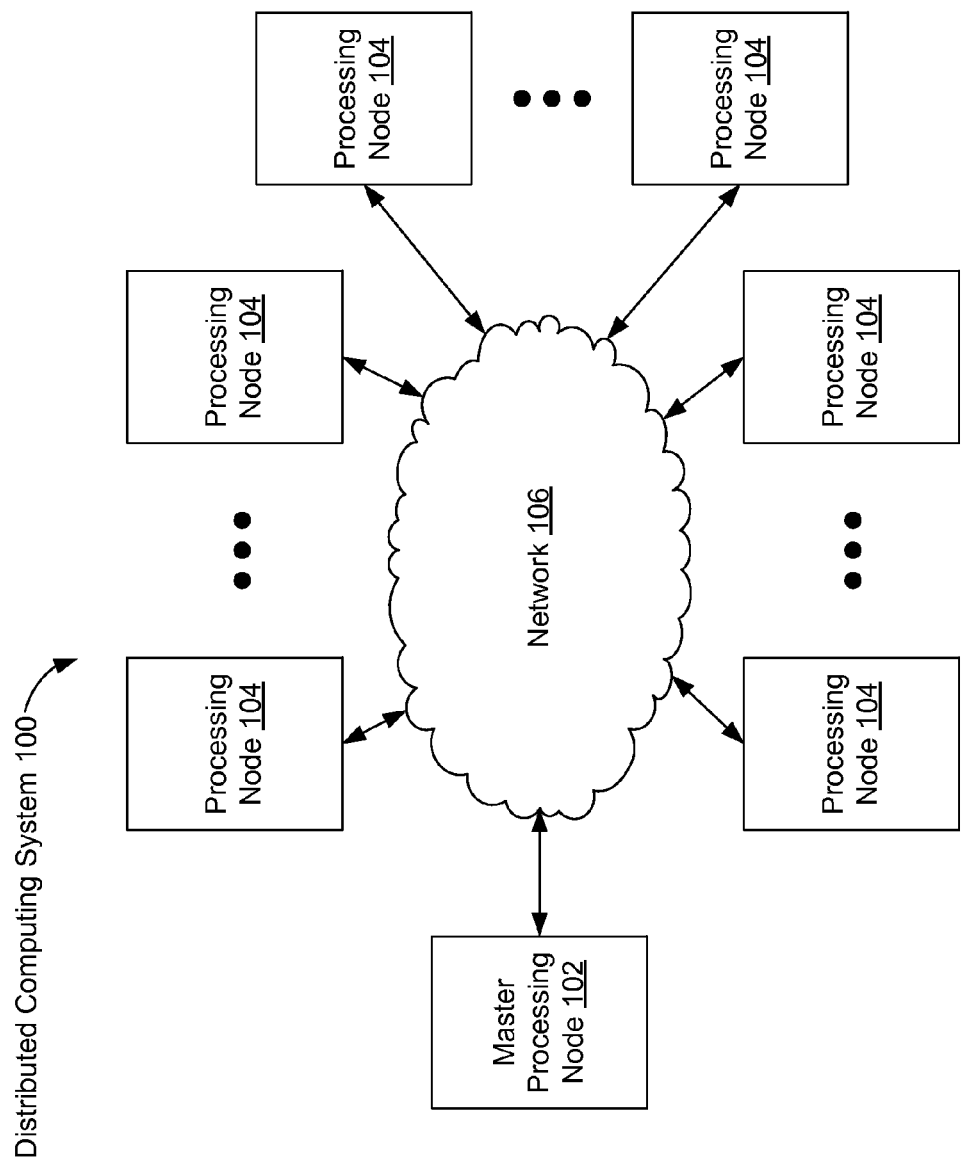

THREAD ASSIGNMENT FOR POWER AND PERFORMANCE EFFICIENCY USING MULTIPLE POWER STATES

TECHNICAL FIELD

The present embodiments relate generally to distributed computing, and more specifically to thread assignment in distributed computing systems.

BACKGROUND

Energy consumption is a significant part of the total cost of ownership of data centers. It therefore is desirable to operate processors in a data center in an efficient manner. Efficient processor operation presents significant challenges, however. For example, power and performance of an application may vary between different phases of the application.

SUMMARY

Embodiments are disclosed in which decisions regarding whether to reassign a thread from a first processing node to a second processing node include consideration of the processing capabilities and/or available performance states of respective processing nodes.

In some embodiments, a method of computing is performed in a computing system that includes a plurality of processing nodes of multiple types configurable to run in multiple performance states. In the method, an application executes on a thread assigned to a first processing node. Power and performance of the application on the first processing node is estimated. Power and performance of the application in multiple performance states on other processing nodes of the plurality of processing nodes besides the first processing node is also estimated. If it is determined that the estimated power and performance of the application on a second processing node in a respective performance state of the multiple performance states is preferable to the power and performance of the application on the first processing node, then the thread is reassigned to the second processing node, with the second processing node in the respective performance state.

In some embodiments, a computing system includes one or more processors and memory storing one or more programs configured for execution by the one or more processors. The one or more programs include instructions to estimate power and performance of an application executing on a thread assigned to a first processing node and instructions to estimate power and performance of the application in multiple performance states on other processing nodes besides the first processing node. The one or more programs also include instructions to determine whether the estimated power and performance of the application on a second processing node in a respective performance state of the multiple performance states is preferable to the power and performance of the application on the first processing node. The one or more programs further include instructions to reassign the thread to the second processing node with the second processing node in the respective performance state, in response to determining that the estimated power and performance of the application on the second processing node in the respective performance state is preferable to the power and performance of the application on the first processing node.

In some embodiments, a non-transitory computer-readable storage medium stores one or more programs configured for execution by one or more processors. The one or more programs include instructions to estimate power and performance of an application executing on a thread assigned to a first processing node and instructions to estimate power and performance of the application in multiple performance states on other processing nodes besides the first processing node. The one or more programs also include instructions to determine whether the estimated power and performance of the application on a second processing node in a respective performance state of the multiple performance states is preferable to the power and performance of the application on the first processing node. The one or more programs further include instructions to reassign the thread to the second processing node with the second processing node in the respective performance state, in response to determining that the estimated power and performance of the application on the second processing node in the respective performance state is preferable to the power and performance of the application on the first processing node.

BRIEF DESCRIPTION OF THE DRAWINGS

The present embodiments are illustrated by way of example and are not intended to be limited by the figures of the accompanying drawings.

FIG. 1A is a block diagram of a distributed computing system in accordance with some embodiments.

Like reference numerals refer to corresponding parts throughout the figures and specification.

DETAILED DESCRIPTION

Figure 1B:
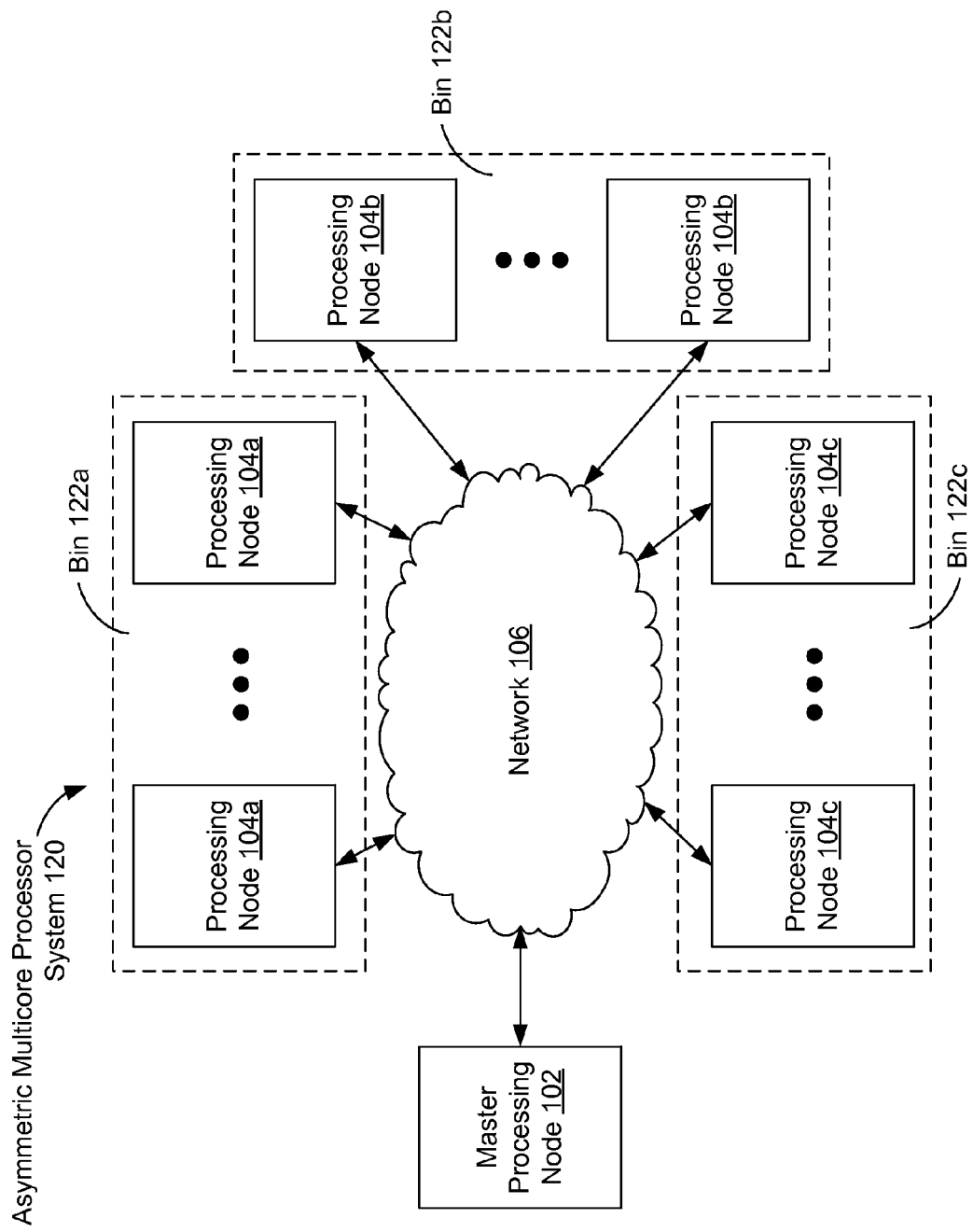
FIG. 1B is a block diagram of an asymmetric multicore processor system in accordance with some embodiments.

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

FIG. 1A is a block diagram of a distributed computing system 100 that includes a master processing node 102 (also referred to as a management processing node) coupled to a plurality of processing nodes 104 through a network 106 in accordance with some embodiments. The topology of the network 106, and thus the topology in which the processing nodes 104 are coupled to teach other and to the master processing node 102, may vary between different embodiments.

In some embodiments, the distributed computing system 100 is implemented in a data center. For example, the master processing node 102 and processing nodes 104 are server computers in a data center. Also, the distributed computing system 100 may be part of a wider distributed computing system. For example, multiple master processing nodes 102 may be arranged in a hierarchical manner and coupled to respective groups of processing nodes 104 through respective networks 106.

The processing nodes 104 (and in some embodiments, the master processing node 102) are configurable to operate in multiple performance states, with different processing nodes 104 potentially operating in different performance states at a given time. Each performance state may correspond to a respective combination of a power supply voltage level ("supply voltage") and a clock frequency. The performance states may be defined, for example, in accordance with the Advanced Configuration and Power Interface (ACPI) specification. Available performance states on a respective processing node 104 may be labeled P0, P1, . . . , Pn, where n is a non-negative integer. The P0 state has the highest supply voltage and/or clock frequency and thus the highest performance and highest power consumption. Successive performance states P1 through Pn have successively smaller supply voltages and/or clock frequencies, and thus have successively lower performance but also successively lower power consumption. The performance states of the processing nodes 104 may be changed dynamically during operation. Performance states may also be referred to as power-performance states.

In some embodiments, the processing nodes 104 are heterogeneous, such that they include different types of processing nodes 104 with different processing capabilities. Different types of processing nodes 104 may include different numbers and/or types of processors (e.g., central processing units (CPUs)).

The processing nodes 104 may be divided into different bins, with each bin including the processing nodes 104 of a particular type in a particular performance state. Each bin thus corresponds to a distinct combination of processing node type and performance state. For example, processing nodes 104 of a first type in a first performance state are included in a first bin, processing nodes 104 of the first type in a second performance state are included in a second bin, processing nodes 104 of a second type in a third performance state are included in a third bin, and so on. The bin to which a processing node 104 is assigned may change dynamically during operation of the processing node 104, by changing the performance state of the processing node 104.

FIG. 1B is a block diagram of an asymmetric multicore processor (AMP) system 120 in accordance with some embodiments. The AMP system 120, which is an example of the distributed computing system 100 (FIG. 1A), includes a first group of processing nodes 104a in a first bin 122a, a second group of processing nodes 104b in a second bin 122b, and a third group of processing nodes 104c in a third bin 122c. The AMP system 120 is referred to as asymmetric because processing nodes 104a, 104b, and/or 104c in different bins 122a, 122b, and/or 122c may be of different types (e.g., may include processor cores of different types). Some of the bins 122a, 122b, and 122c may differ only in the current performance state of their processing nodes 104, however, and not in their types of processing nodes 104.

Figure 2A:
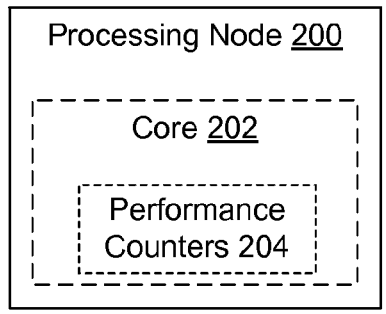
FIGS. 2A-2C are block diagrams of examples of different processing nodes in accordance with some embodiments.
Figure 2B:
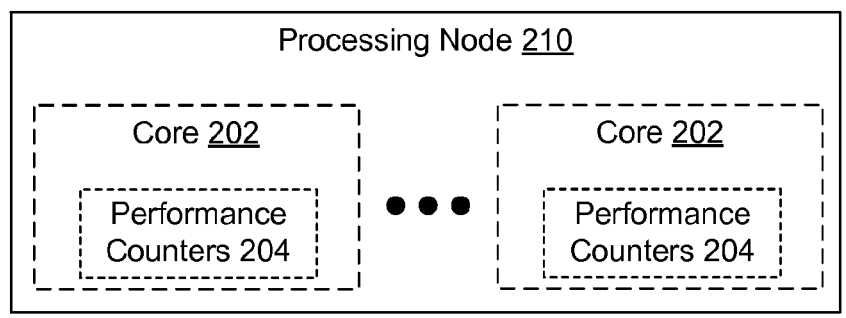
Figure 2C:
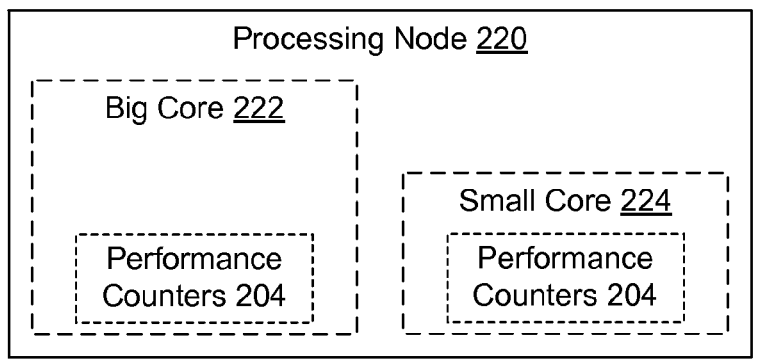

FIGS. 2A-2C are block diagrams of examples of different processing nodes 200, 210, and 220, respectively, in accordance with some embodiments. Each of the processing nodes 200, 210, and 220 is an example of a processing node 104 or master processing node 102 (FIG. 1A), such as a processing node 104a, 104b, or 140c (FIG. 1B). In FIG. 2A, a processing node 200 includes a single processor core 202. In FIG. 2B, a processing node 210 includes two or more processor cores 202. In FIG. 2C, a processing node 220 includes multiple types of processor cores, including a high-performance core 222 and a low-performance core 224. The high-performance core 222, which may be referred to as a big core, has higher performance but also higher power consumption than the low-performance core 224, which may be referred to as a small core.

Each of the processor cores 202, 222, and 224 includes performance counters 204, which store counts of activities within the processor cores 202, 222, and 224. For example, retirement counters count numbers of retired instructions of different types (e.g., integer, floating-point, memory, and/or branch instructions). Instruction counters (e.g., the retirement counters) may be used to derive an instructions-per-cycle (IPC) metric that reports a number of instructions executed per cycle. Cache miss and hit counters count respective numbers of cache misses and cache hits in respective cache memories (e.g., level-one cache, level-two cache, etc.). Branch misprediction and correct-prediction counters count respective numbers of incorrect and correct branch predictions. Respective counters may count numbers of page faults, stalls, and instructions executed under a privileged state. These are merely some examples of performance counters that may be available in a processor core 202, 222, and 224; other examples are possible. In some embodiments, performance counters track counts during specified periods of time and are reset to zero at the beginning of each period of time. Performance counters 204 may be used to estimate performance and power for processor cores 202, 222, and 224, and thus for processor nodes 104.

Power and performance estimates based on a respective set of performance counters 204 in a processor core 202, 222, or 224 may be made for both that processor core and other processor cores (e.g., in other processing nodes 104). For example, a correlation may be established between the power and performance of a processor core 104 and the values of one or more performance counters 204 in the processor core. This correlation may be established empirically and may vary from system to system. Once the correlation has been used to estimate the power and performance of the processor core 104, the estimate is then provided as input to a model that predicts power-and-performance variation between different types of processor cores 104 in different performance states, based on characteristics of the different types of processor cores 104 in the different performance states. This model, which may vary from system to system, is used to estimate power and performance in other processor cores 104. The resulting estimates are thus ultimately based on the values of the one or more performance counters 204.

Changes in values of performance counters 204 (e.g., from one specified time period to another) may be used to identify changes in the phase of an application running on a processor core 202, 222, or 224. For example, values of one or more performance counters 204 for a specified time period are compared to corresponding values of the one or more performance counters 204 for a previous time period. If the values have changed by more than a predefined amount, a phase change is determined to have occurred.

Each of the processing nodes 104 (e.g., each of the processing nodes 104a, 104b, and 104c, FIG. 1B) may execute one or more threads. For example, each processor core 202, 222, and 224 may execute one or more threads. Threads may be dynamically reassigned from core to core and/or from processing node to processing node.

In some embodiments, threads are dynamically reassigned in response to detecting a change in phase of an application. Different phases of an application may operate more efficiently in different performance states and/or on different types of processor cores or processing nodes. A CPU-bound phase of an application may run most efficiently in a high-performance state and/or on a big core 222 (or a high-performance processing node 104), while an input/output (I/O)-bound phase of the same application may run most efficiently in a low-performance state and/or on a small core 224 (or a low-performance processing node 104). Examples of CPU-bound phases of applications include the map phase of a MapReduce application and the optimization phase of a compiler. Examples of I/O-bound phases of applications include the reduce phase of a MapReduce application and the information gathering phase of a compiler.

Figure 3A:
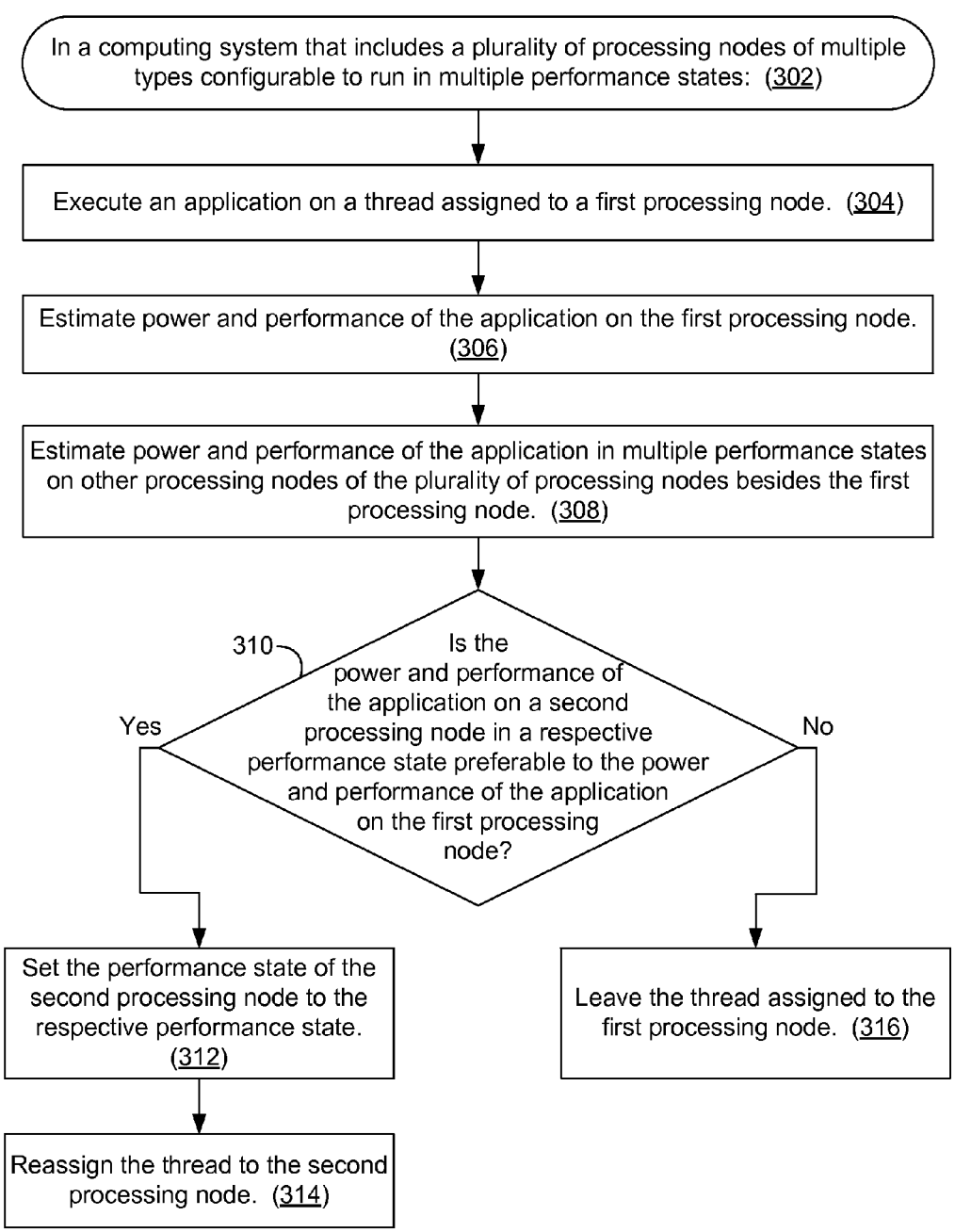
FIGS. 3A-3C are flowcharts showing thread assignment methods in accordance with some embodiments.

FIG. 3A is a flowchart showing a thread assignment method 300 in accordance with some embodiments. The method 300 is performed (302) in a computing system that includes a plurality of processing nodes 104 of multiple types configurable to run in multiple performance states. For example, the method 300 is performed in a distributed computing system 100 (FIG. 1A), such as the AMP system 120 (FIG. 1B). The multiple types of processing nodes 104 may include, for example, processing nodes 200, 210, and/or 220 (FIGS. 2A-2C). In some embodiments, the method 300 is performed by a master processing node 102 (FIGS. 1A-1B). Alternatively, the method 300 may be performed in a distributed manner by respective processing nodes 104. Multiple instances of the method 300 may be performed in parallel for respective threads.

In the method 300, an application is executed (304) on a thread assigned to a first processing node 104. The first processing node 104 is in a specified performance state.

Power and performance of the application on the first processing node 104 is estimated (306). For example, a value of IPC per Watt (IPC/Watt) is estimated for running the application on the first processing node 104. In some embodiments, this estimate is based on values of one or more performance counters 204 (FIGS. 2A-2C), using a known correlation between the values of the one or more performance counters 204 and IPC/Watt (or other metrics indicating power and performance). This correlation may be determined empirically and may vary from system to system.

Power and performance of the application is also estimated (308) in multiple performance states on other processing nodes 104 of the plurality of processing nodes 104 besides the first processing node 104. For example, values of IPC/Watt are estimated for running the application in each of the multiple performance states on the other processing nodes 104. In some embodiments, this estimation is performed by applying the estimate of operation 306 to a model of power-and-performance variation between different types of processor nodes 104 in different performance states (e.g., between different bins).

In some embodiments, the estimates made in operations 306 and 308 are made for respective processor cores 202, 222, and/or 224 (FIGS. 2A-2C) in respective processing nodes 104. In some embodiments, the estimates are made for respective bins (e.g., respective ones of the bins 122a, 122b, and 122c, FIG. 1B).

It is determined (310) whether the power and performance of the application on a second processing node 104 in a respective performance state is preferable to the power and performance of the application on the first processing node 104. For example, it is determined whether the IPC/Watt for the second processing node 104 in the respective performance state exceeds the IPC/Watt for the first processing node 104 by a predefined amount. The predefined amount may be greater than zero to account for the performance overhead associated with reassigning a thread. In some embodiments, the IPC/Watt for the second processing node 104 in the respective performance state is the highest value of IPC/Watt estimated in the operation 308. In some embodiments, the determination of the operation 310 is made for a respective processor core 202, 222, or 224 (FIGS. 2A-2C) of the second processing node 104.

If the power and performance is not preferable on the second processing node 104 in the respective performance state (310—No), the thread is left assigned (316) to the first processing node 104. If it is, however, (310—Yes), then the performance state of the second processing node 104 (e.g., of a respective processor core 202, 222, or 224 in the second processing node 104) is set (312) to the respective performance state (assuming the second processing node 104 is not already in the respective performance state) and the thread is reassigned (314) to the second processing node 104 (e.g., to the respective processor core 202, 222, or 224 in the second processing node 104).

Reassigning the thread may include reassigning the thread from a first bin to a second bin (e.g., from a first one of the bins 122a, 122b, and 122c to a second one of the bins 122a, 122b, and 122c, FIG. 1B), in accordance with some embodiments.

Figure 3B:
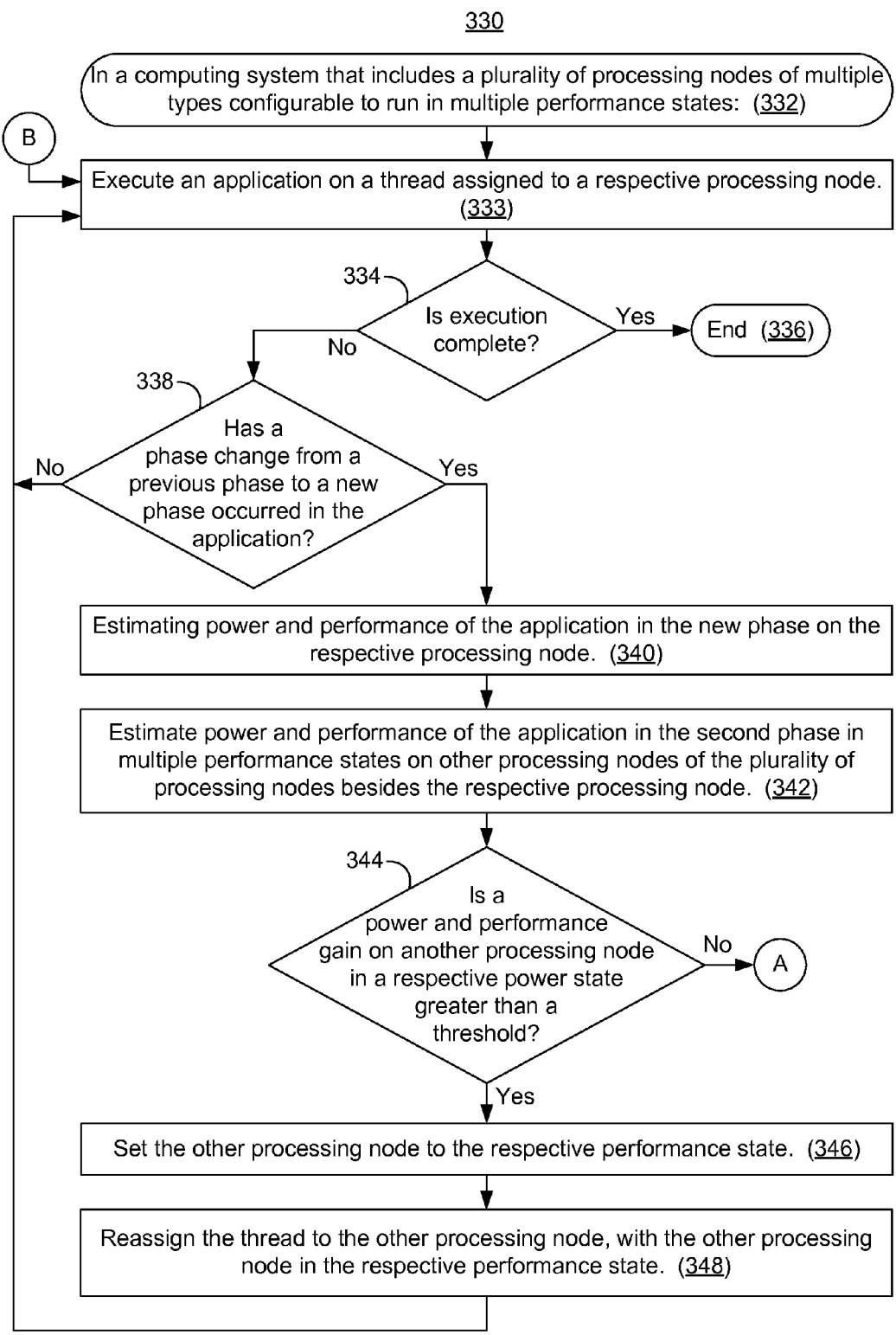
Figure 3C:
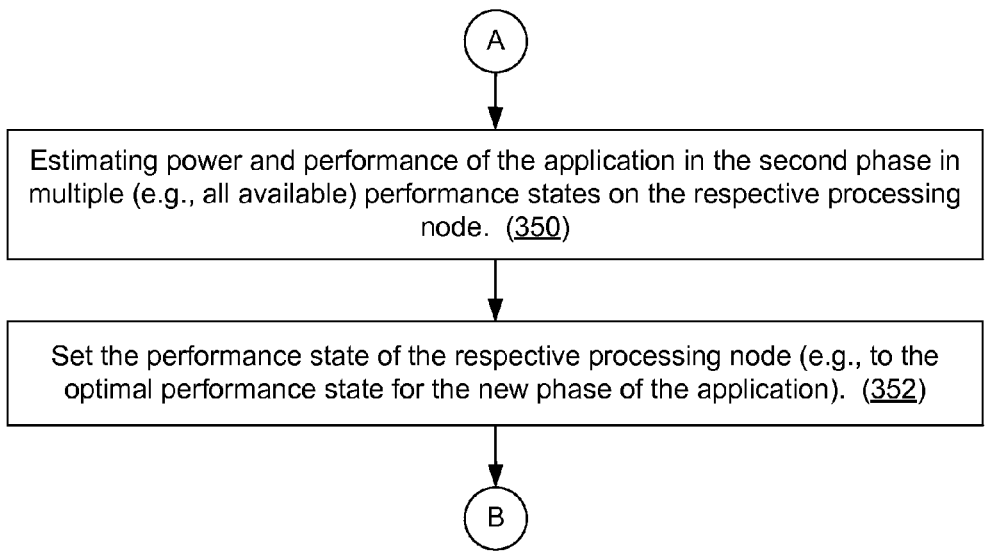

FIGS. 3B and 3C are a flowchart showing a thread assignment method 330 in accordance with some embodiments. The method 330, like the method 300 (FIG. 3A), is performed (332) in a computing system that includes a plurality of processing nodes 104 of multiple types configurable to run in multiple performance states. For example, the method 330 is performed in a distributed computing system 100 (FIG. 1A), such as the AMP system 120 (FIG. 1B). The multiple types of processing nodes 104 may include, for example, processing nodes 200, 210, and/or 220 (FIGS. 2A-2C). In some embodiments, the method 300 (FIG. 3A) is performed as part of the method 330. In some embodiments, the method 330 is performed by a master processing node 102 (FIGS. 1A-1B). Alternatively, the method 330 may be performed in a distributed manner by respective processing nodes 104. Multiple instances of the method 330 may be performed in parallel for respective threads.

In the method 330, an application executes (333) on a thread assigned to a respective processing node 104 (e.g., as for the operation 304, FIG. 3A). The respective processing node 104 is in a specified performance state. It is determined (334) whether execution of the application is complete. If it is (334—Yes), the method 330 ends (336). Otherwise (334—No), it is determined 338 whether a phase change from a previous phase of the application to a new phase of the application has occurred. If no phase change is detected (338—No), performance of the method 330 returns to the operation 333: the application continues to execute on the thread assigned to the respective processing node 104.

If a phase change is detected (338—Yes), then power and performance of the application in the new phase on the respective processing node 104 is estimated (340). For example, a value of IPC/Watt is estimated for running the application on the respective processing node 104. In some embodiments, this estimation is based on values of one or more performance counters 204 (FIGS. 2A-2C) in the respective processing node 104 in the new phase, using a known correlation between the values of the one or more performance counters 204 and IPC/Watt (or other metrics indicating power and performance). This correlation may be determined empirically and may vary from system to system.

Power and performance of the application in the second phase in multiple performance states on other processing nodes 104 of the plurality of processing nodes 104 besides the respective processing node 104 is also estimated (342). For example, values of IPC/Watt are estimated for running the application in each of the multiple performance states on the other processing nodes 104. In some embodiments, this estimation is performed by applying the estimate of operation 340 to a model of power-and-performance variation between different types of processor nodes 104 in different performance states (e.g., between different bins).

In some embodiments, the estimates made in operations 340 and 342 are made for respective processor cores 202, 222, and/or 224 (FIGS. 2A-2C) in respective processing nodes 104. In some embodiments, the estimates are made for respective bins (e.g., respective ones of the bins 122a, 122b, and 122c, FIG. 1B).

It is determined (344) whether a power and performance gain on another processing node 104 in a respective power state is greater than a threshold. For example, it is determined whether the IPC/Watt for the other processing node 104 in the respective performance state exceeds the IPC/Watt for the respective processing node 104 by a predefined amount. The predefined amount may be greater than zero to account for the performance overhead associated with reassigning a thread. In some embodiments, the IPC/Watt for the other processing node 104 in the respective performance state is the highest value of IPC/Watt estimated in the operation 342. In some embodiments, the determination of the operation 344 is made for a respective processor core 202, 222, or 224 (FIGS. 2A-2C) of the other processing node 104.

If the power and performance gain is greater than the threshold (344—Yes), the other processing node 104 (e.g., a respective processor core 202, 222, or 224 in the other processing node 104) is set (346) to the respective performance state (assuming it is not already in the respective performance state). The thread is reassigned (348) to the other processing node 104 (e.g., to the respective processor core 202, 222, or 224 in the other processing node 104), with the other processing node in the respective performance state. Performance of the method 330 then returns to the operation 333, with the other processing node of operations 346 and 348 becoming the respective processing node of the operation 333. At this point, the application executes on the processing node to which it was reassigned in operation 348, and the method 330 repeats.

Reassigning the thread may include reassigning the thread from a first bin to a second bin (e.g., from a first one of the bins 122a, 122b, and 122c to a second one of the bins 122a, 122b, and 122c, FIG. 1B), in accordance with some embodiments.

If the power and performance gain is not greater than the threshold (344—No), the power and performance of the application in the second phase in multiple (e.g., all available) performance states on the respective processing node 104 may be estimated (350, FIG. 3C). The performance state of the respective processing node 104 is set (352) to a value that is determined based on the estimation. For example, the performance state is set to the optimal performance state for the new phase of the application. Performance of the method 330 then returns to the operation 333 (FIG. 3B), with the thread still assigned to the respective processing node 104.

In some embodiments, the operation 350 is combined with the operation 342, and a single determination is made of the processing node 104 and power state to be used for the thread.

The methods 300 and 330 thus allow efficient operation of the distributed computing system 100 (FIG. 1A) by dynamically reassigning threads to improve (e.g., optimize) power and performance. While the methods 300 and 330 include a number of operations that appear to occur in a specific order, it should be apparent that the methods 300 and 330 can include more or fewer operations, some of which can be executed serially or in parallel. An order of two or more operations may be changed, performance of two or more operations may overlap, and two or more operations may be combined into a single operation.

Figure 4:
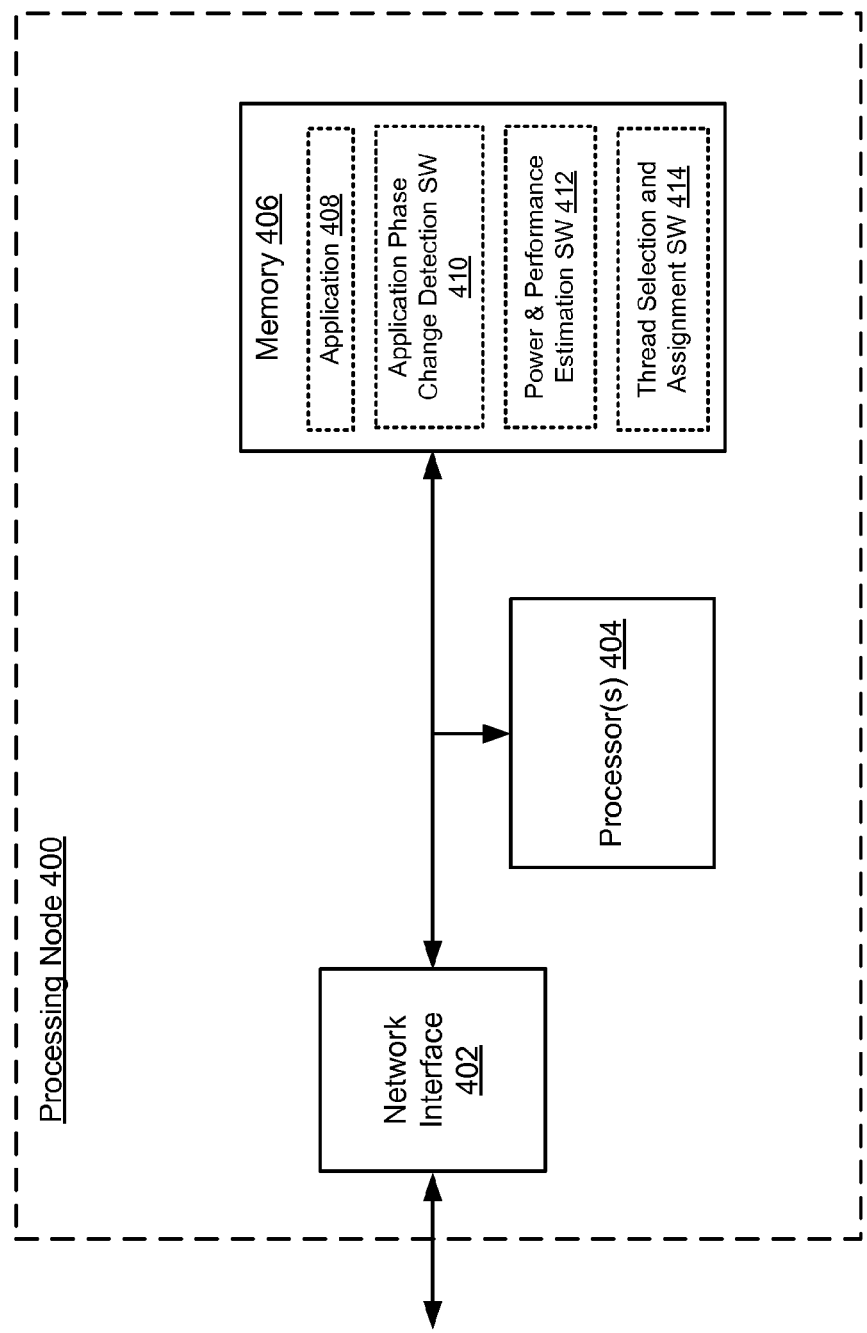
FIG. 4 is a block diagram of processing node in accordance with some embodiments.

FIG. 4 is a block diagram of a processing node 400 (e.g., a master processing node 102 or processing node 104, FIG. 1A) in accordance with some embodiments. A network interface 402 in the processing node 400 transmits and receives signals through the network 106 (FIGS. 1A-1B). One or more processors 404 (e.g., including one or more processor cores 202, 222, and/or 224, FIGS. 2A-2C) are coupled to the network interface 402 and to memory 406. The memory 406 may store an application 408 for execution by the one or more processors 404 (e.g., by a thread running on one of the processors 404).

The memory 406 may include a non-transitory computer-readable storage medium (e.g., one or more nonvolatile memory devices) that stores one or more programs with instructions configured for execution by the one or more processors 404. The one or more programs include application phase change detection software 410, power and performance estimation software 412, and/or thread selection and assignment software 414. In some embodiments, the power and performance estimation software 412 and thread selection and assignment software 414 together include instructions that, when executed by the one or more processors 404, cause the processing node 400 to perform all or a portion of the method 300 (FIG. 3A). In some embodiments, the application phase change detection software 410, power and performance estimation software 412, and thread selection and assignment software 414 together include instructions that, when executed by the one or more processors 404, cause the processing node 400 to perform all or a portion of the method 330 (FIGS. 3B-3C). Instructions for performing the methods 300 and/or 330 may also be stored on a non-transitory computer-readable storage medium (e.g., a CD-ROM, DVD, or magnetic tape) that is external to the processing node 400.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of computing, comprising:
in a computing system comprising a plurality of processing nodes of multiple types, each processing node configurable to operate in multiple performance states, the plurality of processing nodes comprising a first processing node and a second processing node:
executing an application on a thread assigned to the first processing node;
estimating power and performance of the application on the first processing node;
estimating power and performance of the application in multiple performance states on other processing nodes of the plurality of processing nodes besides the first processing node, the other processing nodes including the second processing node;
determining that the estimated power and performance of the application on the second processing node operating in a respective performance state of the multiple performance states is preferable to the power and performance of the application on the first processing node; and reassigning the thread to the second processing node, with the second processing node operating in the respective performance state.

2. The method of claim 1, further comprising detecting a phase change of the application from a first phase to a second phase; wherein:
estimating the power and performance of the application on the first processing node and the other processing nodes comprises estimating the power and performance of the application in the second phase; and
the determining comprises determining that the estimated power and performance of the second phase of the application on the second processing node in the respective performance state is preferable to the power and performance of the second phase of the application on the first processing node.

3. The method of claim 1, further comprising, before reassigning the thread to the second processing node, setting the second processing node to the respective performance state.

4. The method of claim 1, wherein:
estimating the power and performance of the application on the first processing node comprises estimating a value of instructions per cycle per Watt (IPC/Watt) for the first processing node; and
estimating the power and performance of the application in the multiple performance states on the other processing nodes comprises estimating respective values of IPC/Watt for the multiple performance states on the other processing nodes.

5. The method of claim 4, wherein the determining comprises determining that the IPC/Watt for the respective performance state on the second processing node exceeds the IPC/Watt for the first processing node by a predefined amount.

6. The method of claim 1, wherein:
the first processing node comprises a plurality of performance counters; and
estimating the power and performance of the application on the first processing node comprises estimating the power and performance of the application on the first processing node based on values of one or more of the plurality of performance counters.

7. The method of claim 1, wherein each of the multiple performance states corresponds to a combination of a power supply setting and a clock frequency.

8. The method of claim 1, wherein:
the second processing node comprises a plurality of cores; and
reassigning the thread to the second processing node comprises reassigning the thread to a respective core of the second processing node.

9. The method of claim 8, wherein:
the plurality of cores of the second processing node comprises multiple types of cores; and
the determining comprises determining that the estimated power and performance of the application on the respective core of the second processing node in the respective performance state is preferable to the power and performance of the application on the first processing node.

10. A computing system, comprising:
a plurality of processing nodes, each processing node configurable to operate in multiple performance states, the plurality of processing nodes comprising a first processing node and a second processing node; and
memory storing one or more programs configured for execution by at least some of the plurality of processing nodes, the one or more programs comprising:
instructions to estimate power and performance of an application executing on a thread assigned to the first processing node;
instructions to estimate power and performance of the application in multiple performance states on other processing nodes besides the first processing node, the other processing nodes including the second processing node;
instructions to determine whether the estimated power and performance of the application on the second processing node operating in a respective performance state of the multiple performance states is preferable to the power and performance of the application on the first processing node; and
instructions to reassign the thread to the second processing node with the second processing node operating in the respective performance state, in response to determining that the estimated power and performance of the application on the second processing node in the respective performance state is preferable to the power and performance of the application on the first processing node.

11. The computing system of claim 10, wherein the one or more programs further comprise instructions to detect a phase change of the application from a first phase to a second phase; wherein:
the instructions to estimate the power and performance of the application on the first processing node and the other processing nodes comprise instructions to estimate the power and performance of the application in the second phase; and
the instructions to determine comprise instructions to determine whether the estimated power and performance of the second phase of the application on the second processing node in the respective performance state is preferable to the power and performance of the second phase of the application on the first processing node.

12. The computing system of claim 10, wherein the one or more programs further comprise instructions to set the second processing node to the respective performance state before reassigning the thread to the second processing node.

13. The computing system of claim 10, wherein:
the instructions to estimate the power and performance of the application on the first processing node comprise instructions to estimate a value of instructions per cycle per Watt (IPC/Watt) for the first processing node; and
the instructions to estimate the power and performance of the application in the multiple performance states on the other processing nodes comprise instructions to estimate respective values of IPC/Watt for the multiple performance states on the other processing nodes.

14. The computing system of claim 10, wherein the instructions to estimate the power and performance of the application on the first processing node comprise instructions to estimate the power and performance of the application on the first processing node based on values of one or more performance counters in the first processing node.

15. The computing system of claim 10, wherein the instructions to reassign the thread to the second processing node comprise instructions to reassign the thread to a respective core of a plurality of cores in the second processing node.

16. A non-transitory computer-readable storage medium storing one or more programs configured for execution by a computing system comprising a plurality of processing nodes of multiple types, each processing node configurable to operate in multiple performance states, the plurality of processing nodes comprising a first processing node and a second processing node, the one or more programs comprising:
  instructions to estimate power and performance of an application executing on a thread assigned to the first processing node;
  instructions to estimate power and performance of the application in multiple performance states on other processing nodes besides the first processing node, the other processing nodes including the second processing node;
  instructions to determine whether the estimated power and performance of the application on the second processing node operating in a respective performance state of the multiple performance states is preferable to the power and performance of the application on the first processing node; and
  instructions to reassign the thread to the second processing node with the second processing node operating in the respective performance state, in response to determining that the estimated power and performance of the application on the second processing node in the respective performance state is preferable to the power and performance of the application on the first processing node.

17. The non-transitory computer-readable storage medium of claim 16, wherein the one or more programs further comprise instructions to detect a phase change of the application from a first phase to a second phase; wherein:
  the instructions to estimate the power and performance of the application on the first processing node and the other processing nodes comprise instructions to estimate the power and performance of the application in the second phase; and
  the instructions to determine comprise instructions to determine whether the estimated power and performance of the second phase of the application on the second processing node in the respective performance state is preferable to the power and performance of the second phase of the application on the first processing node.

18. The non-transitory computer-readable storage medium of claim 16, wherein the one or more programs further comprise instructions to set the second processing node to the respective performance state before reassigning the thread to the second processing node.

19. The non-transitory computer-readable storage medium of claim 16, wherein: the instructions to estimate the power and performance of the application on the first processing node comprise instructions to estimate a value of instructions per cycle per Watt (IPC/Watt) for the first processing node; and
  the instructions to estimate the power and performance of the application in the multiple performance states on the other processing nodes comprise instructions to estimate respective values of IPC/Watt for the multiple performance states on the other processing nodes.

20. The non-transitory computer-readable storage medium of claim 16, wherein the instructions to estimate the power and performance of the application on the first processing node comprise instructions to estimate the power and performance of the application on the first processing node based on values of one or more performance counters in the first processing node.

* * * * *